United States Patent [19]

Connon

[11] Patent Number: 4,577,347
[45] Date of Patent: Mar. 25, 1986

[54] DIRECT VIEW HELMET MOUNTED TELESCOPE

[75] Inventor: Thomas R. Connon, Dayton, Ohio

[73] Assignee: The United States of America as represented by the Secretary of the Air Force, Washington, D.C.

[21] Appl. No.: 634,247

[22] Filed: Jul. 25, 1984

[51] Int. Cl.⁴ .............................................. A42B 3/02
[52] U.S. Cl. .............................................. 2/6; 2/422; 350/537
[58] Field of Search ............... 2/6, 422; 350/143, 545, 350/537

[56] References Cited

U.S. PATENT DOCUMENTS

| 2,848,924 | 8/1958 | Potez . | |
|---|---|---|---|
| 3,051,047 | 8/1962 | Fieux | 350/537 |
| 3,059,519 | 10/1962 | Stanton | 350/145 |
| 3,205,303 | 9/1965 | Bradley | 178/6.8 |
| 3,425,769 | 2/1969 | Stone | 350/72 |
| 3,787,109 | 1/1974 | Vizenor | 2/6 X |
| 3,804,495 | 4/1974 | Rayow et al. | 2/422 X |
| 3,889,190 | 6/1975 | Palmer | 2/422 X |
| 4,156,292 | 5/1979 | Helm et al. | 350/145 |

FOREIGN PATENT DOCUMENTS

| 2409021 | 7/1979 | France | 2/422 |
| 7710788 | 4/1978 | Netherlands | 350/537 |

Primary Examiner—Louis K. Rimrodt
Attorney, Agent, or Firm—Donald J. Singer; Bobby D. Scearce

[57] ABSTRACT

An improved helmet is provided including an optical system whereby the wearer may telescopically acquire an image of a field of view, which comprises a telescope retractably mounted to the helmet by means of a two-part hinged boom, one end of which is pivotally attached to the side of the helmet, and the other end of which supports the telescope via a rotatable and adjustable mounting whereby the telescope may be conveniently moved from a stored position beside the helmet to an operative position in front of the wearer's eye, and aligned and focused in the operative position.

5 Claims, 2 Drawing Figures

DIRECT VIEW HELMET MOUNTED TELESCOPE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to the field of helmet mounted optical systems, and more particularly to a novel direct view, helmet mounted telescope for providing a substantially increased range of direct view for the wearer.

In the operation of modern high performance aircraft, the pilot, navigator and other crew members are required to maintain control over numerous systems of the aircraft and to continuously visually acquire substantial amounts of information from those systems for efficient operation of the aircraft. In combat situations the crew members must additionally divide their attention between visual acquisition and identification of mission targets and the visual facets of normal aircraft control. It is therefore highly desirable that the crew members be able to telescopically acquire and identify a target, or otherwise maintain an enhanced telescopic range of view with minimum changes of line of sight.

The present invention provides an improved helmet, having particular utility to an aircarft pilot, navigator, or other crew member, including a helmet mounted telescope for substantially increased range of direct view for the wearer to provide improved visual target acquisition and identification capability. The present invention includes a small retractable telescope of about 3× to 4× power which is mounted via a rotatable mounting on one end of a two-part hinged boom; the boom is pivotally attached at its other end to the side of a standard helmet. The boom may take the form of a modified microphone mount. The two parts of the boom are hingedly connected to permit folding whereby the telescope may easily be moved into an extended operative position in front of the wearer's eye or to a folded stored position alongside the helmet inside the limits defined by an ejection envelope for the wearer.

It is, therefore a principal object of the present invention to provide an improved helmet, having particular utility by aircraft pilots, navigators or other crew members.

It is a further object of the present invention to provide an improved helmet including a retractable telescope to display a telescopic image of an acquired field of view to the wearer.

It is a further object of the invention to provide a helmet whereby the wearer has substantially hands-off telescopic vision capability.

These and other objects of the present invention will become apparent as the detailed description of certain representative embodiments thereof proceeds.

SUMMARY OF THE INVENTION

In accordance with the foregoing principles and objects of the present invention, an improved helmet is provided including an optical system whereby the wearer may telescopically acquire an image of a field of view, which comprises a telescope retractably mounted to the helmet by means of a two-part hinged boom, one end of which is pivotally attached to the side of the helmet, and the other end of which supports the telescope via a rotatable and adjustable mounting whereby the telescope may be conveniently moved from a stored position beside the helmet to an operative position in front of the wearer's eye, and aligned and focused in the operative position.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
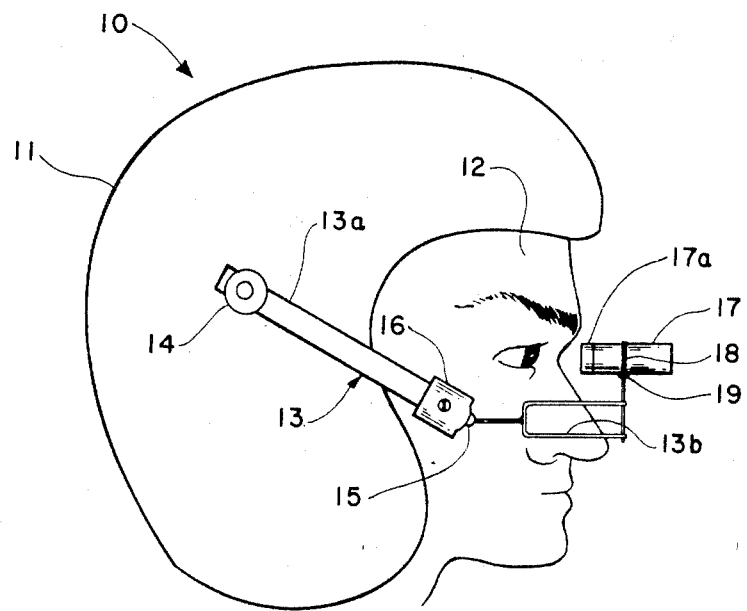
FIG. 1 is a side elevational view of an improved helmet having mounted thereon the novel retractable telescope system representative of the present invention.

Referring now to FIG. 1, shown therein is a side elevational view of the improved helmet system 10 including the novel retractable telescope of the present invention. As shown therein, a helmet 11, worn by wearer/observer 12, has a two-part hinged boom 13 pivotally mounted at one end to helmet 11 using a rotatable friction fitting 14 so that part 13a of boom 13 may pivot about fitting 14 in a plane substantially tangent to helmet 11 at fitting 14. Fitting 14 may be configured to include means to confine the rotation of part 13a within predetermined angular limits, however, it may be preferable to configure fitting 14 to frictionally resist rotation of part 13a so that part 13a may be selectively positionable. The second part 13b of boom 13 may be pivotally mounted to part 13a for selective positioning thereof out of the plane of movement of part 13a, by way of a hinge, universal mounting, or the like, such as represented in the drawings as friction ball mount 15 housed within a fitting 16. Fittings 14 and 16 may include length adjustable means for parts 13a, 13b in order to allow substantially universal positioning of parts 13a, 13b relative to helmet 11.

A direct view telescope 17 is pivotally mounted to the second end of part 13b substantially as shown in FIG. 1, and, for this purpose, part 13b includes pivotal mounting means such as mounting ring 18 and friction ball mount 19. For the purpose described, telescope 17 may comprise a conventional monocular telescope of from about 3× to 4× power and having a single focusable eyepiece 17a.

Figure 2:
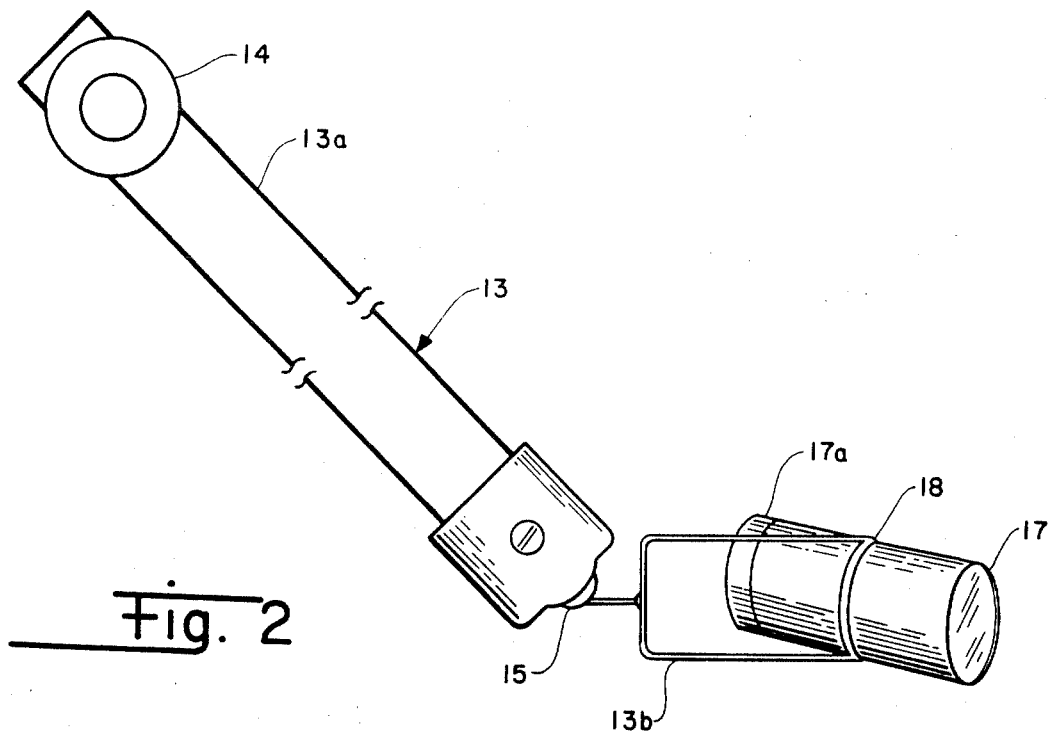
FIG. 2 is a view in detail of a representative two part hinged boom for supporting the telescope.

Hinged boom 13 may take the form of a modified microphone mount, such as illustrated in FIG. 2, wherein part 13b of hinged boom 13 may include a pair of swivel mounts attached to mounting ring 18 whereby telescope 17 is held between the ends of part 13b as shown. The means by which mounting ring 18 and telescope 17 is attached to the end of a boom, such as represented in the drawings by boom 13, may be varied within the scope of these teachings so long as part 13b of boom 13 and telescope 17 mounted thereto may be pivoted toward and in front of observer 12 to allow telescope 17 to be selectively positioned in the line of sight of observer 12.

The invention therefore provides an improved helmet including a telescope which may be retractably positioned in front of the wearer's eye and in his line of light. It is understood that certain structural modifications to the invention as described may be made, as might occur to one with skill in the field of this invention, within the scope of the appended claims. Therefore, all embodiments contemplated hereunder which achieve the objects of the present invention have not been shown in complete detail. Other embodiments may be developed without departing from the spirit of this invention or from the scope of the appended claims.

I claim:

1. An improved helmet including means for telescopically acquiring a field of view for the wearer of said helmet, comprising:
    (a) a hinged boom having first and second ends, and including first and second parts hingedly joined intermediate said ends;
    (b) means for pivotally mounting said boom at said first end to the side of said helmet for pivotal movement of said first part in a plane substantially tangent to said helmet at the point of mounting;
    (c) means for hingedly joining said second part of said boom to said first part for pivotal movement of said second part relative to said first part out of said plane;
    (d) a telescope; and
    (e) means for pivotally mounting said telescope to said boom at said second end thereof, whereby said telescope may be selectively rotated from a stored position beside said helmet to an operative position in front of said wearer.

2. The helmet as recited in claim 1 wherein said means for pivotally mounting said boom to said helmet, said means for hingedly joining said second part to said first part, and said means for pivotally mounting said telescope to said boom at said second end comprise friction mounts.

3. The helmet as recited in claim 1 wherein said means for hingedly joining said second art of said boom to said first part comprises a friction ball mount.

4. The helmet as recited in claim 1 wherein said means for pivotally mounting said telescope to said boom comprises a ring on said telescope and a friction ball mount connecting said ring to said boom.

5. The helmet as recited in claim 1 wherein said means for pivotally mounting said telescope to said boom comprises a ring on said telescope and a pair of swivel mounts connecting said ring to said boom.

* * * * *

UNITED STATES PATENT AND TRADEMARK OFFICE
CERTIFICATE OF CORRECTION

PATENT NO. : 4,577,347

DATED : March 25, 1986

INVENTOR(S) : Thomas R. Connon

It is certified that error appears in the above-identified patent and that said Letters Patent is hereby corrected as shown below:

Claim 3, line 2, "art" should be ---part---.

Signed and Sealed this

Twenty-ninth Day of July 1986

[SEAL]

Attest:

DONALD J. QUIGG

Attesting Officer

Commissioner of Patents and Trademarks